(12) United States Patent
Yeh et al.

(10) Patent No.: US 8,199,475 B2
(45) Date of Patent: Jun. 12, 2012

(54) ELECTRONIC DEVICE

(75) Inventors: Ying-Hao Yeh, Taoyuan County (TW); I-Cheng Chuang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 59 days.

(21) Appl. No.: 12/776,438

(22) Filed: May 10, 2010

(65) Prior Publication Data

US 2011/0122555 A1 May 26, 2011

(30) Foreign Application Priority Data

Nov. 24, 2009 (TW) .............................. 98139999 A (51) Int. Cl.
*G06F 1/16* (2006.01)
*H05K 5/00* (2006.01)
*H05K 7/00* (2006.01)

(52) U.S. Cl. .............. 361/679.27; 361/679.3; 455/575.4

(58) Field of Classification Search ............. 361/679.21, 361/679.26–679.3, 679.12, 679.55–679.59; 455/575.1–575.4
See application file for complete search history.

(56) References Cited

U.S. PATENT DOCUMENTS

| | | | | |
|---|---|---|---|---|
| 5,168,426 A * | 12/1992 | Hoving et al. | ........... | 361/679.09 |
| 5,267,123 A * | 11/1993 | Boothroyd et al. | ...... | 361/679.09 |
| 5,548,478 A * | 8/1996 | Kumar et al. | ............ | 361/679.27 |
| 6,483,445 B1 * | 11/2002 | England | ........................... | 341/22 |
| 6,539,208 B1 * | 3/2003 | Mori | .......................... | 455/575.3 |
| 6,636,419 B2 * | 10/2003 | Duarte | ..................... | 361/679.09 |
| 6,862,171 B1 * | 3/2005 | Maskatia et al. | ......... | 361/679.06 |
| 7,065,835 B2 * | 6/2006 | Kuramochi | ..................... | 16/357 |
| 7,068,497 B2 * | 6/2006 | Chu | ......................... | 361/679.06 |
| 7,107,084 B2 * | 9/2006 | Duarte et al. | .............. | 455/575.3 |
| 7,158,634 B2 * | 1/2007 | Eromaki | .................. | 379/433.13 |
| 7,225,002 B2 * | 5/2007 | Lee et al. | .................... | 455/575.4 |
| 7,239,505 B2 * | 7/2007 | Keely et al. | .............. | 361/679.09 |
| 7,362,579 B2 * | 4/2008 | Cho | ................................ | 361/707 |
| 7,583,496 B2 * | 9/2009 | Lai | .............................. | 361/679.3 |
| 2003/0109230 A1 * | 6/2003 | Duarte et al. | ................... | 455/90 |

(Continued)

FOREIGN PATENT DOCUMENTS

EP 1703702 9/2006

(Continued)

OTHER PUBLICATIONS

"Search Report of European Counterpart Application" issued on Sep. 10, 2010, p. 1-p. 4, in which the listed references were cited.

(Continued)

*Primary Examiner* — Jinhee Lee
*Assistant Examiner* — Andrian S Wilson
(74) *Attorney, Agent, or Firm* — Jianq Chyun IP Office (57) ABSTRACT

A handheld electronic device including a first body, a second body and a linkage is provided. The second body is stacked on the first body, and a first fulcrum at an end of the second body is slidably disposed on the first body. The linkage provided with an end pivotally connected to the first body via a pivot and another end slidably disposed on the second body via a second fulcrum is located between the first body and the second body. When the electronic device is transformed from a retracted state to an expanded state, the second body slides relative to the first body and then the second fulcrum is raised to form an included angle between the first body and the second body.

9 Claims, 6 Drawing Sheets

U.S. PATENT DOCUMENTS

| | | | |
|---|---|---|---|
| 2004/0062000 A1* | 4/2004 | Duarte | 361/683 |
| 2006/0133052 A1* | 6/2006 | Harmon et al. | 361/752 |
| 2006/0135227 A1* | 6/2006 | Chang et al. | 455/575.3 |
| 2006/0229115 A1* | 10/2006 | Puranen | 455/575.1 |
| 2007/0097607 A1* | 5/2007 | Lee | 361/679 |
| 2007/0105606 A1* | 5/2007 | Yoon et al. | 455/575.4 |
| 2007/0217129 A1* | 9/2007 | Chuang et al. | 361/679 |
| 2007/0217135 A1* | 9/2007 | Chuang et al. | 361/681 |
| 2007/0252202 A1 | 11/2007 | Park et al. | |
| 2008/0062624 A1* | 3/2008 | Regen et al. | 361/680 |
| 2008/0081505 A1* | 4/2008 | Ou et al. | 439/374 |
| 2008/0161075 A1* | 7/2008 | Kim et al. | 455/575.4 |
| 2008/0297995 A1* | 12/2008 | Lai | 361/680 |
| 2008/0304217 A1* | 12/2008 | Lai et al. | 361/681 |
| 2009/0011802 A1* | 1/2009 | Malthe et al. | 455/575.1 |
| 2009/0016002 A1* | 1/2009 | Lai et al. | 361/681 |
| 2009/0233659 A1* | 9/2009 | Ke et al. | 455/575.3 |

FOREIGN PATENT DOCUMENTS

| | | |
|---|---|---|
| EP | 1773031 | 4/2007 |
| KR | 1020060046741 | 5/2006 |
| TW | I290601 | 12/2007 |
| TW | 200832112 | 8/2008 |
| TW | 200850110 | 12/2008 |

OTHER PUBLICATIONS

"1st Office Action of European Counterpart Application" issued on Oct. 6, 2010, p. 1-p. 5, in which the listed references were cited.

"Office Action of Taiwan Counterpart Application", issued on Dec. 21, 2011, p. 1-p. 8, in which the listed references were cited.

\* cited by examiner

ELECTRONIC DEVICE

CROSS-REFERENCE TO RELATED APPLICATION

This application claims the priority benefit of Taiwan application serial No. 98139999, filed on Nov. 24, 2009. The entirety of the above-mentioned patent application is hereby incorporated by reference herein and made a part of this specification.

BACKGROUND OF THE INVENTION

1. Field of the Invention

The present application relates to an electronic device, and more particularly, to a sliding type electronic device.

2. Description of Related Art

With advancement of information technology at present, it becomes easier and easier to obtain necessary information from daily-used electronic devices. On the other hand, relying on the dramatic improvement of the state of the art, handheld electronic devices are developed to be lighter and slimmer. Being advantaged in portability, handheld electronic devices are popular and broadly used in our daily life.

Various types of handheld electronic devices such as bar type, folded type, rotating type, and sliding type, etc. are proposed to meet different preferences and requirements. In respect to a sliding type handheld electronic device, two bodies are slidably coupled together to be operated between an expanded state and a retracted state. Stacking the two bodies facilitates minimizing dimensions of the sliding type handheld electronic device, while the two bodies are expanded in a specific operating mode.

Generally, a conventional sliding type handheld electronic device is provided with a keyboard disposed on a lower body and a display screen disposed on an upper body. By sliding the upper body toward a side of the lower body, the keyboard on the lower body is exposed such that a user can input information into the handheld electronic device through the keyboard. However, in the expanded state, the upper body with the display screen and the lower body with the keyboard turn into parallel, which results in an uncomfortable view angle for the user as operating the handheld electronic device and thus fails to maintain both of convenience as inputting information and comfort in watching the display screen.

On the other hand, when the sliding type handheld electronic device is in the expanded state, the upper body and the lower body are partially stacked with each other, and thereby a part of the lower body is covered by the upper body. Accordingly, the available region on the lower body is restricted and the arrangement of the keyboard or other devices on the lower body is therefore limited.

SUMMARY OF THE INVENTION

The present application provides an electronic device having two bodies arranged to have an included angle in an expanded state, so as to improve the convenience and comfort in using the electronic device.

The application provides an electronic device for increasing the available region on the lower body and thereby improving the flexibility of the arrangement of devices and the structural design.

As embodied and broadly described herein, an electronic device including a first body, a second body and a linkage is provided. The second body is stacked on the first body, and a first fulcrum at an end of the second body is slidably disposed on the first body. The linkage is located between the first body and the second body, wherein the linkage has a first end pivotally connected to the first body via a pivot and a second end slidably disposed on the second body via a second fulcrum. When the electronic device is transformed from a retracted state to an expanded state, the second body slides relative to the first body and protrudes from a side of the first body, and the second fulcrum of the linkage slides on the second body. Then, the second fulcrum reaches a critical position on the second body to have the first fulcrum and the second fulcrum being spaced in a minimum distance. After that, the second fulcrum is raised and the first fulcrum proceeds to slide relative to the first body in the same direction, the second body is pivoted relative to the first body via the first fulcrum, and the linkage is pivoted relative to the first body via the pivot to transform the electronic device to the expanded state. As a result, an included angle is formed between the first body and the second body, wherein the included angle is greater than or equal to 90 degrees and less than 180 degrees.

As described above, the present application drives the second body sliding relative to the first body by using a linkage accompanying with movable fulcrums, so as to raise the second body with an inclined angle in the expanded state. The above design provides a simple transforming mechanism which facilitates increasing the available region on the first body. Therefore, not only the convenience and comfort of using the electronic device can be enhanced, but also the available region on the lower body can be increased and thereby the flexibility of the arrangement of devices and the structural design are improved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1A:
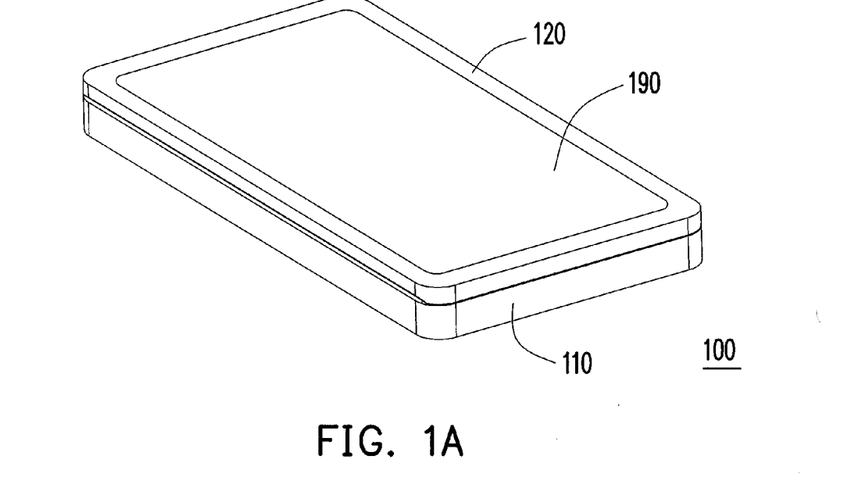
FIGS. 1A through 1C are schematic diagrams illustrating operation of an electronic device according to one embodiment of the present invention.
Figure 1B:
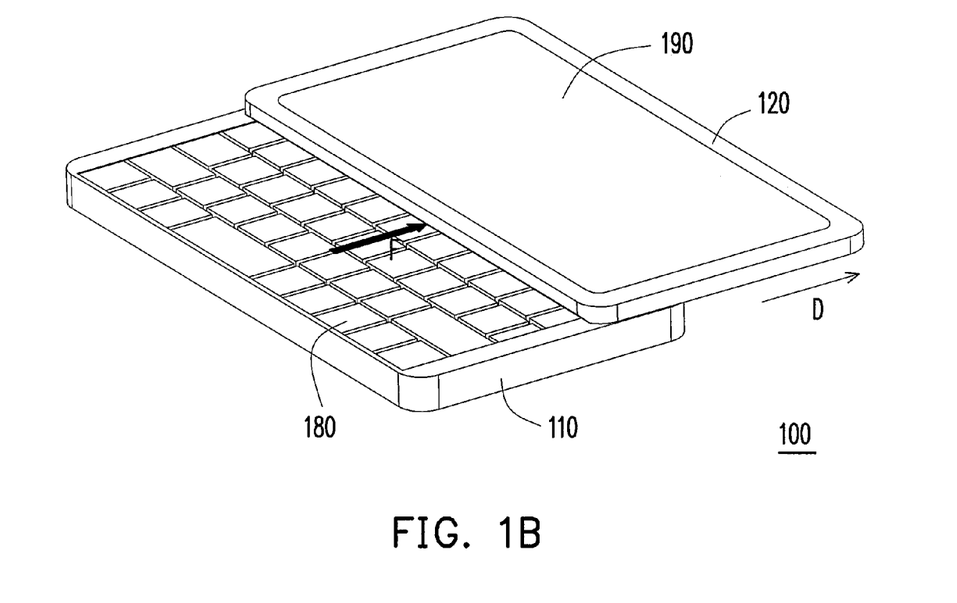
Figure 1C:
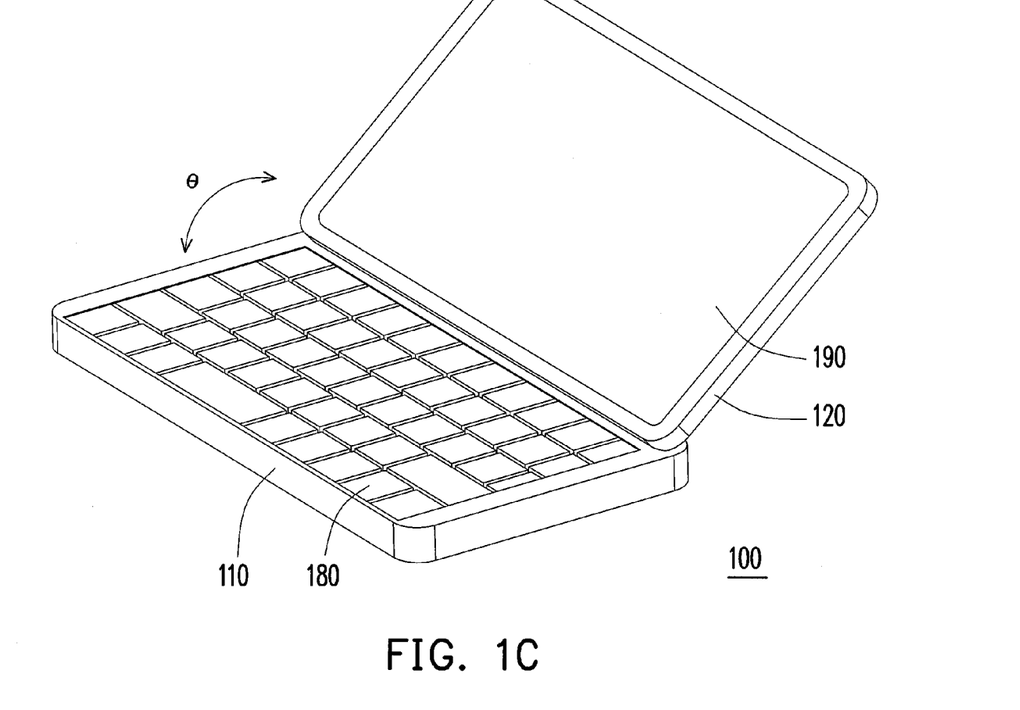

FIGS. 1A through 1C are schematic diagrams illustrating operation of an electronic device according to one embodiment of the present invention. The electronic device 100 may be a sliding type cell phone, a notebook computer or other like electronic devices.

As shown in FIG. 1A, the electronic device 100 is in a retracted state, and the second body 120 is stacked immediately on the first body 110. In general, the second body 120 has a display screen 190 to display image or text information, the first body 110 has a keyboard 180 for a user to input information. However, the present application is not limited thereto. With the development and various functions of the electronic device, the display screen 190 may further be a touch screen, whereby the user can input information by a touch manner and performs operations between the first body 110 and the second body 120 back and forth. In other embodiments not shown, both of the first body 110 and the second body 120 may be provided with display panels, so as to achieve a synchronously display or a touch operation of dual screen.

Then, as shown in FIG. 1B, a lateral force is applied on the second body 120 to drive the second body 120 shifting relative to the first body 110 along a direction D and protruding from a side of the first body 110. At this time, the second body 120 exposes the keyboard 180 or other applicable devices on the first body 110.

Next, referring to FIG. 1C, as raising the second body 120 manually, an end of the second body 120 proceeds sliding relative to the first body 110 along the direction D, and the second body 120 rotates relative to the first body 110. At this time, the electronic device 100 is in the expanded state, wherein an included angle θ is formed between the first body 110 and the second body 120, and the included angle θ is greater than or equal to 90 degrees and less than 180 degrees. Since the second body 120 is located with the included angle θ relative to the first body 110 in the expanded state, a comfortable view angle of watching the display screen 190 of the second body 120 as operating the keyboard 180 of the first body 110 at the same time can be obtained. In other words, the user can watch the image or text information on the display screen 190 in a preferred view angle as inputting information via the keyboard 180. Additionally, in the present step, since the second body 120 proceeds to move further a distance along the direction D, more available region on the first body 110 can be exposed by the second body 120. In other words, the present embodiment is capable of increasing region for disposing the keyboard 180 on the first body 110, and the keyboard 180 is not exposed until the electronic device 100 becomes the expanded state as shown in FIG. 1C.

Figure 2:
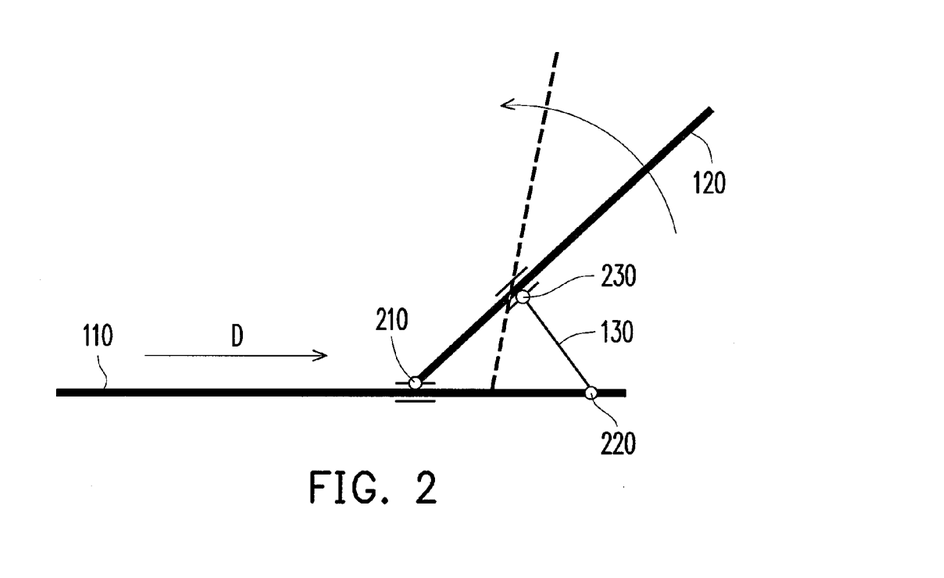
FIG. 2 is a free body diagram of the electronic device of FIGS. 1A through 1C.

FIG. 2 is a free body diagram of the electronic device of FIGS. 1A through 1C. To achieve the aforementioned design, an end of the second body of the embodiment has a first fulcrum 210 slidably disposed on the first body 110. In addition, a linkage 130 is provided between the first body 110 and the second body 120, wherein an end of the linkage 130 is pivotally connected to the first body 110 via a pivot 220, and another end of the linkage 130 has a second fulcrum 230 slidably disposed on the second body 120. By the mechanical design, as the electronic device 100 is transformed from the retracted state as shown in FIG. 1A to the expanded state as shown in FIG. 1C, the second body 120 slides relative to the first body 110 via the first fulcrum 210 and protrudes from a side of the first body 110, and the second fulcrum 230 of the linkage 130 slides on the second body 120. In addition, the first fulcrum 210 and the second fulcrum 230 have a minimum distance therebetween. In other words, when the second body 120 moves to the position as shown in FIG. 1B, the second fulcrum 230 is located on a critical position on the second body 120, and the minimum distance from the first fulcrum 210 to the second fulcrum 230 is obtained. After that, the second body 120 is raised, such that the first fulcrum 210 proceeds to slide relative to the first body 110 in the direction D, and the linkage 130 is pivoted relative to the first body 110 via the pivot 220, so as to transform the electronic device 110 to the expanded state as shown in FIG. 1C.

Figure 3A:
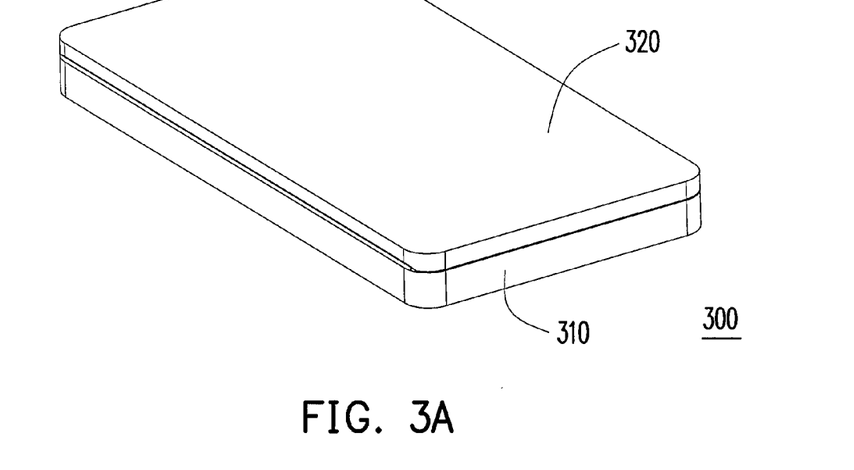
FIGS. 3A-3C schematically shows an operating process of an electronic device according to an embodiment of the present invention.
Figure 3B:
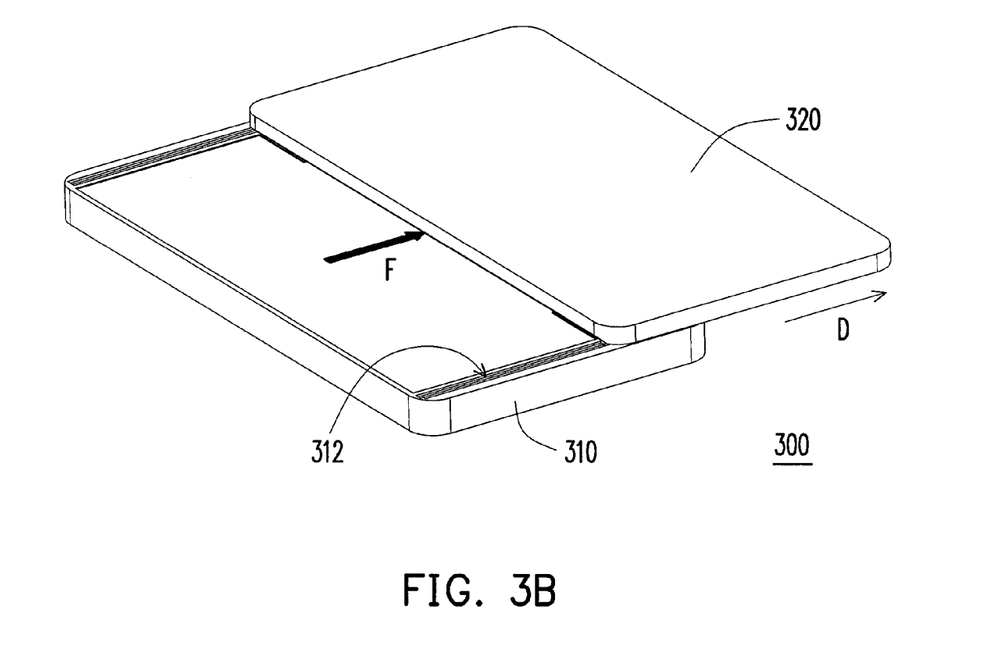
Figure 3C:
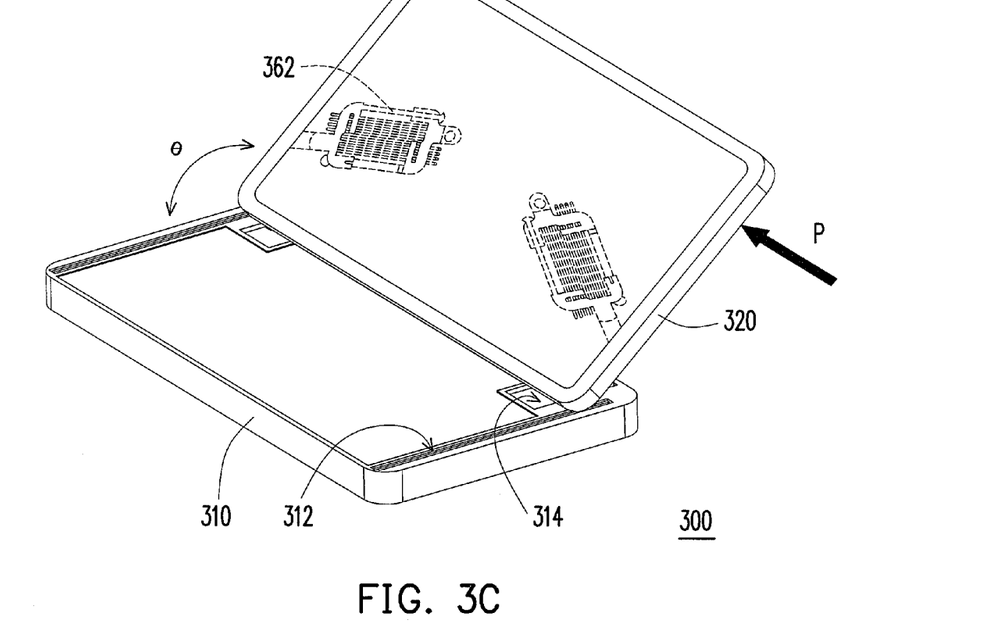
Figure 4:
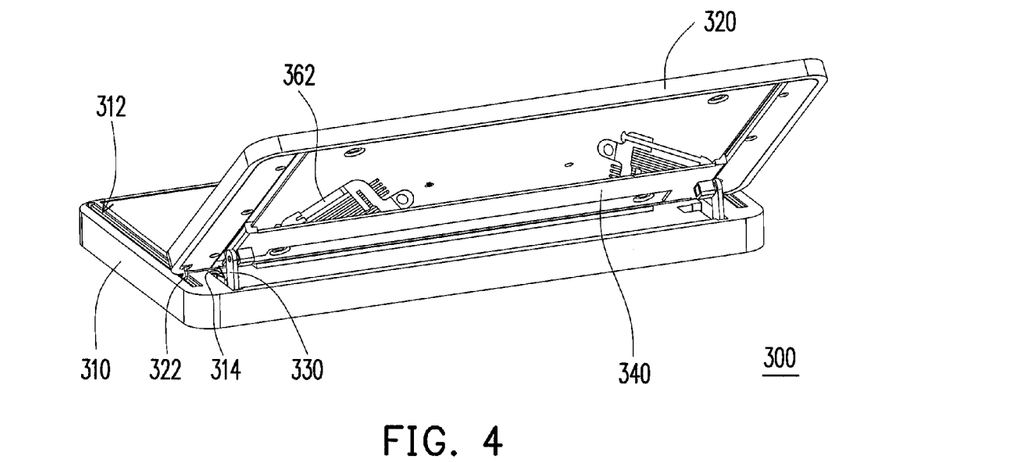
FIG. 4 is a schematic view of the electronic device of FIG. 3C from another perspective.
Figure 5A:
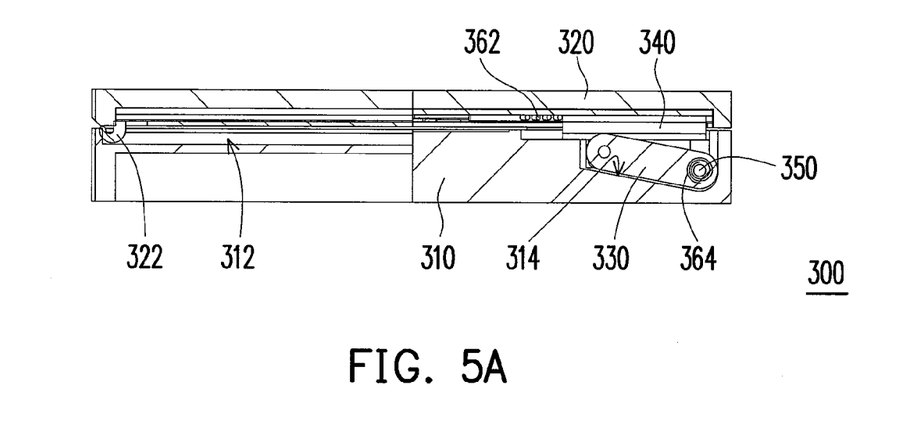
FIGS. 5A through 5C are cross-sectional views of the electronic device in FIGS. 3A through 3C.
Figure 5B:
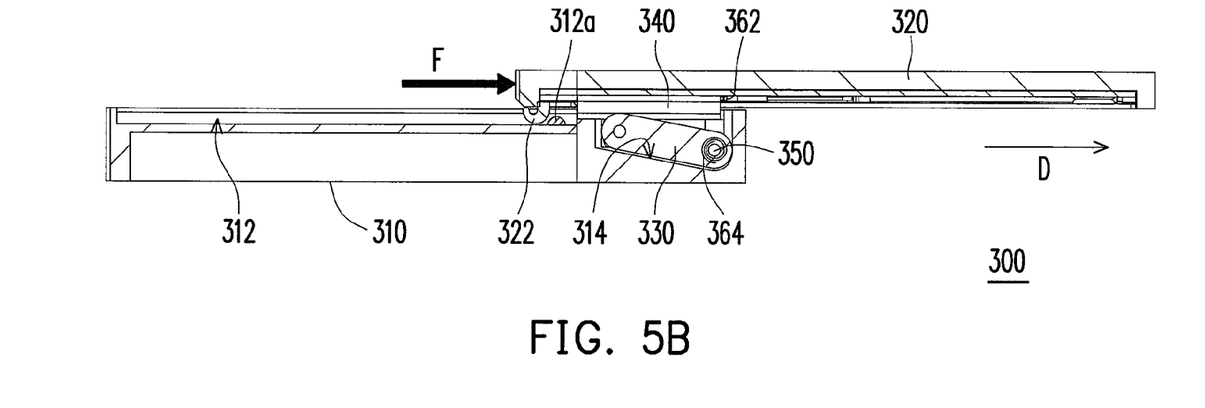
Figure 5C:
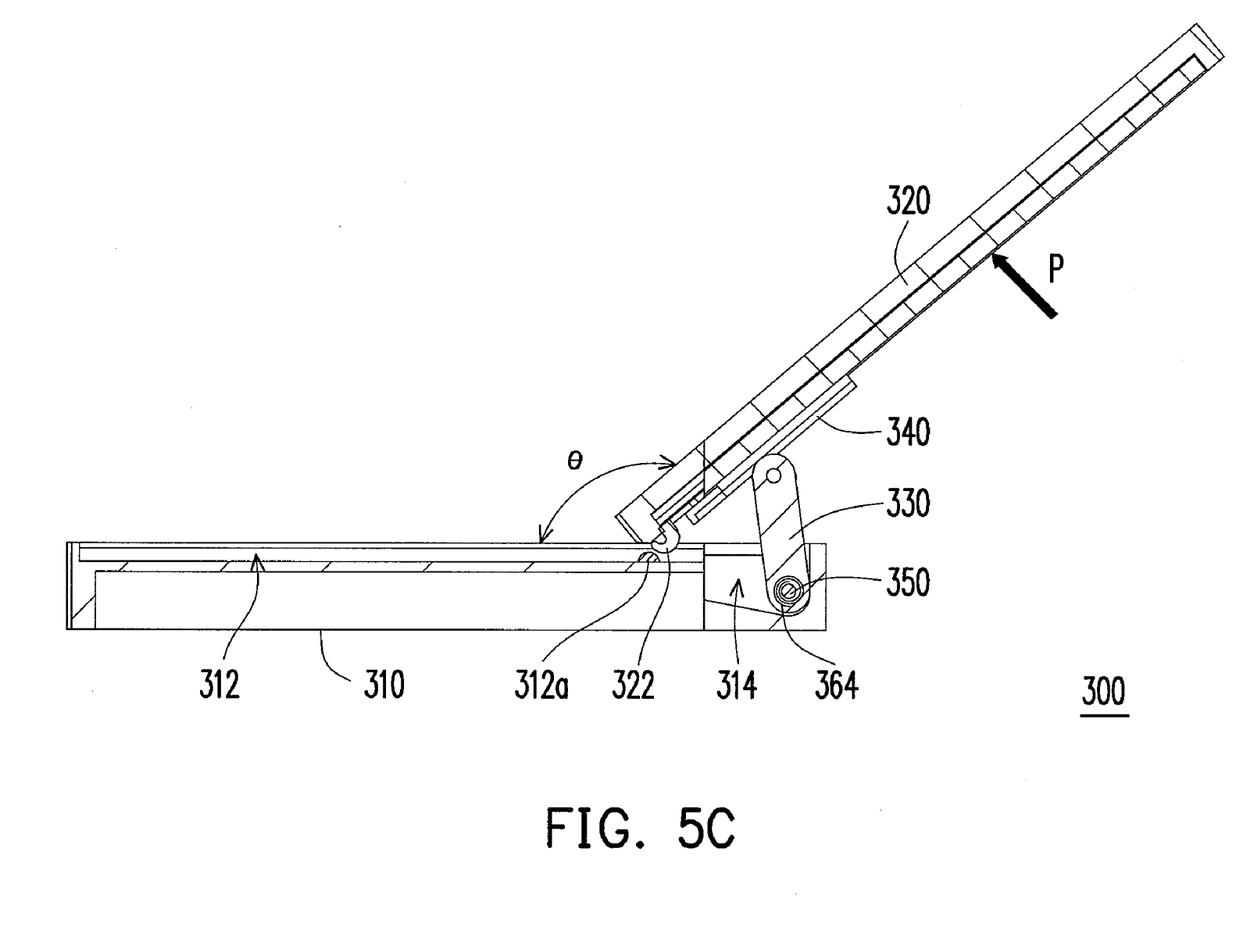

A kind of mechanical design for accomplishing the above operation according to the present embodiment is proposed in the following. FIGS. 3A-3C schematically shows an operating process of an electronic device according to an embodiment of the present invention. FIG. 4 is a schematic view of the electronic device of FIG. 3C from another perspective. FIGS. 5A through 5C are cross-sectional views of the electronic device in FIGS. 3A through 3C.

Referring to FIGS. 3 through 5, the electronic device 300 of the present embodiment includes a first body 310, a second body 320, two linkages 330 and a first sliding block 340. The first body has two sliding rails 312, and the second body 320 is stacked over the first body 310, wherein an end of the second body 320 has two second sliding blocks 322 respectively slidably disposed in the two sliding rails 312 to serve as the first fulcrum 210 in FIG. 2. The first sliding block 340 is slidably disposed on the bottom of the second body 320, while the two linkages 330 are respectively disposed at two opposite sides of the first sliding block 340 and are located between the first body 310 and the second body 320. An end of each of the linkage 330 is connected to the first body 110 via a pivot 350, while another end of the linkage 330 is pivotally connected to the first block 340 to serve as the second fulcrum 230 in FIG. 2.

When the electronic device 300 is in the retracted state as shown in FIGS. 3A and 4A, the second body 320 is located immediately on the first body 310, and the first body 310 has two receptacle spaces 314 for accommodating the linkages 330.

Then, when the second body 320 receives a lateral force F and slides relative to the first body 310 along the direction D, the second sliding blocks 322 of the second body 320 slides in the corresponding sliding rails 312 and then arrives at the positions as shown in FIGS. 3B and 5B. At the same time, the first sliding block 340 slides relative to the second body 320 to arrive at a critical position on the second body 320.

Then, a force P is applied at an end portion of the second body 320 to raise the second body 320. Thereby, the second body 320 proceeds to slide relative to the first body 310 along the direction D, and since the first sliding block 340 is located on the critical position on the second body 320, the second body 320 is pivoted relative to the first body 310 via the second sliding blocks 322, and the linkages 330 are pivoted relative to the first body 310 via the pivot 350. At this time, the electronic device 300 is in the expanded state as shown in FIGS. 3C and 5C, wherein an included angle θ is formed between the first body 310 and the second body 320, and the included angle θ is greater than or equal to 90 degrees and less than 180 degrees.

Referring to FIGS. 3 through 5, the present embodiment further disposing a first elastic member 362 (as depicted in dotted lines in part of figures) between the first sliding block 340 and the second body 320, to provide an elastic force for driving the first sliding block 340 sliding relative to the second body 320. More particularly, the first elastic member 362 may be a coil spring or a helical spring, or other elastic members capable of driving the first sliding block 340 and the second body 320 to perform a semi-auto sliding operation, so as to provide the elastic force required in the operation of expansion or retraction between the first body 310 and the second body 320. Namely, the electronic device 300 of the present embodiment is capable of performing a semi-auto sliding operation. When the second body 320 reaches the retracted position as shown in FIGS. 3A and 5A, the second body 320 can automatically slide to the position as shown in FIGS. 3B and 5B after being pushed from the retracted position in FIGS. 3A and 5A to the right side on the figures in a few distance.

Furthermore, the present embodiment may dispose a second elastic member 364 between the linkage 330 and the first body 310 to provide an elastic force for driving the linkage 330 to pivot relative to the first body 310. Herein, the second elastic member 364 may be a torsion spring disposed on the pivot 350 and connected between the linkage 330 and the first body 310. No matter in the retracted state or the expanded state, or in the transforming process between the retracted state and the expanded state, the second elastic member 364 provides a rotational torque of a fixed direction to the linkage 330. By the rotational torque, the linkage 330 can pivot relative to the first body 310 from the position of FIG. 5B to the position of FIG. 5C, to raise the second body 320. Accordingly, the lateral force F is no more applied to the electronic device 300 in the state of FIGS. 3B and 5B, and the electronic device 300 can be transformed to the expanded state by the rotational torque provided by the second elastic member 364 to drive the second body 320 reaching the position in FIGS. 3C and 5C.

On the other hand, when the electronic device 300 is transformed from the expanded state to the retracted, the second body 320 is pressed toward the first body 310, for example, a force capable of overcoming the rotational torque of the second elastic member 364 is applied to an end of the second body 320, so as to drive the second body 320 back to the position in FIGS. 3B and 5B. Then, the second body 320 can automatically slide backward to the retracted position as shown in FIGS. 3A and 5A after being pushed from the position in FIGS. 3B and 5B to the left side on the figures in a few distance.

Furthermore, according to still another embodiment not provided in the drawings of the present invention, the second elastic member may further be a helical spring disposed between the linkage 330 and the first body 310. Otherwise, the second elastic member 364 can also be other equivalent elements to provide the aforementioned rotational torque to the linkage 330.

Additionally, the present embodiment may further dispose an engaging structure, for example a protrusion 312a as shown in FIGS. 5A through 5C, at an end of the sliding rail 312, to locate the second sliding block 322 on the sliding rail 312. Therefore, when the electronic device 300 is in the expanded state of FIG. 5C, the second sliding block 322 passes the protrusion 312a and enters an end portion of the sliding rail 312 for being engaged on the position by the protrusion 312a. Meanwhile, the second body 320 is located on the position as shown in FIG. 5C. Oppositely, when the electronic device 300 is transformed from the expanded state to the retracted state, a force capable of overcoming the engagement of the protrusion 312a is applied to the second body 320, so as to drive the second body 320 back to retracted state via the above process. Undoubtedly, according to other embodiments that are not depicted herein, other engaging structures capable of providing similar engaging effect as mentioned above can also be adopted herein to replace the protrusion 312a.

Furthermore, the pivot of the present embodiment can be referred to any pivoting mechanisms, for example, a bearing and a bearing seat, or other equivalent elements, capable of providing pivoting function. In addition, except disposing the second elastic member 364 on the pivot 350 as mentioned above, the present embodiment may further adopt a pivot with specific function, such as a torsion hinge, a multi-stop hinge or a damping hinge, so as to provide different degrees of buffering, returning or locating functions.

In summary, the electronic device of the present application is provided with a linkage accompanying with movable fulcrums to drive the second body sliding relative to the first body and being raised with an inclined angle, to increasing the available region on the first body as expanding the second body relative to the first body. Therefore, not only the convenience and comfort of using the electronic device can be enhanced, but also the flexibility of the arrangement of devices and the structural design are improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
a first body;
a second body, stacked on the first body, wherein an end of the second body has a first fulcrum slidably disposed on the first body;
a linkage, located between the first body and the second body, wherein the linkage has a first end pivotally connected to the first body via a pivot and a second end slidably disposed on the second body via a second fulcrum, and a projection of the second fulcrum on the first body is located between the first fulcrum and the pivot;
a first sliding block slidably disposed at the bottom of the second body, wherein the second end of the linkage is pivotall connected to the first sliding block to form a second fulcrum; and
a first elastic member disposed between the first sliding block and the second body to provide an elastic force for driving the first sliding block to slide relative to the second body,
when the electronic device is transformed from a retracted state to an expanded state, the second body slides relative to the first body and protrudes from a side of the first body, the second fulcrum of the linkage slides on the second body, and the second fulcrum reaches a critical position on the second body to have the first fulcrum and the second fulcrum being spaced in a minimum distance, and then,
the second fulcrum is raised and the first fulcrum proceeds to slide relative to the first body in the same direction, the second body is pivoted relative to the first body via the first fulcrum in a first direction, and the linkage is pivoted relative to the first body via the pivot in a second direction opposite to the first direction to transform the electronic device to the expanded state, wherein the first body and the second body forms an included angle greater than or equal to 90 degrees and less than 180 degrees.

2. The electronic device of claim 1, wherein the first body has a receptacle space for accommodating the linkage as the electronic device is in the retracted state.

3. The electronic device of claim 1, wherein the first elastic member is a coil spring or a helical spring.

4. The electronic device of claim 1, wherein the first body has a sliding rail, and the first fulcrum is slidably disposed in the sliding rail.

5. The electronic device of claim 4, wherein the end of the second body has a second sliding block slidably disposed in the sliding rail to form the first fulcrum.

6. The electronic device of claim 4, wherein the sliding rail is provided with an engaging structure for engaging the first fulcrum as the electronic device is in the expanded state.

7. The electronic device of claim 1, wherein the pivot is a torsion hinge, a multi-stop hinge or a damping hinge.

8. The electronic device of claim 1, further comprising a second elastic member disposed between the linkage and the first body to provide an elastic force for driving the linkage to pivot relative to the first body.

9. The electronic device of claim 1, wherein the second body has a display screen, and the first body has a keyboard.

* * * * *